(12) United States Patent
Carlinsky et al.

(10) Patent No.: US 6,467,231 B1
(45) Date of Patent: Oct. 22, 2002

(54) PROTECTIVE BUILDING STRUCTURE SYSTEM

(76) Inventors: Herman Carlinsky, 95 Eagle Chase, Woodbury, NY (US) 11797; Raymond Ackley, P.O. Box 49, Sugar Loaf, NY (US) 10981

(*) Notice: Subject to any disclaimer, the term of this patent is extended or adjusted under 35 U.S.C. 154(b) by 0 days.

(21) Appl. No.: 09/492,904

(22) Filed: Jan. 27, 2000

(51) Int. Cl.[7] ................................................. E04B 1/38
(52) U.S. Cl. ........................ 52/698; 52/92.2; 52/123.1; 52/126.1; 52/126.6; 52/170; 52/293.3
(58) Field of Search ........................... 52/698, 704–709, 52/296, 297, 2.21, 66, 67, 123.1, 126.6, 125.2, 125.3, 125.6, 126.1, 126.3, 223.14, 169.5, 169.14, 169.9, 170, 293.3, 741.5, 92.2

(56) References Cited

U.S. PATENT DOCUMENTS

| | | |
|---|---|---|
| 592,190 A | 10/1897 | Bond |
| 2,189,486 A | 2/1940 | D'Amico |
| 2,653,468 A | 9/1953 | Rowles |
| 2,693,620 A | 11/1954 | Berman |
| 3,008,435 A | 11/1961 | Dupuy |
| 3,212,105 A | 10/1965 | Baker et al. |
| 3,546,827 A | 12/1970 | Demarais |
| 3,858,371 A | 1/1975 | Averill |
| 4,536,996 A * | 8/1985 | Soden et al. ..................... 52/67 |
| 4,601,141 A * | 7/1986 | Donnelly ..................... 52/126.6 |
| 4,631,878 A * | 12/1986 | Laramore ....................... 52/90 |
| 4,747,242 A | 5/1988 | Aarstad |
| 5,794,389 A | 8/1998 | Vysma |
| 5,829,205 A * | 11/1998 | Clark et al. ..................... 52/67 |
| 5,832,676 A * | 11/1998 | Gillmore et al. ............... 52/67 |
| 5,848,507 A * | 12/1998 | Bozich ......................... 52/299 |
| 5,867,950 A * | 2/1999 | Claisse ....................... 52/125.6 |
| 5,950,373 A * | 9/1999 | Hoff et al. .................... 52/79.5 |
| 6,112,929 A * | 9/2000 | Ota ............................... 220/8 |
| 6,151,840 A * | 11/2000 | Simison ......................... 52/67 |

* cited by examiner

Primary Examiner—Carl D. Friedman
Assistant Examiner—Yvonne M. Horton
(74) Attorney, Agent, or Firm—Bryan Cave LLP

(57) ABSTRACT

An interlocking wall and roof system for the protection of a building structure is disclosed. The interlocking roof and wall system is equipped with a plurality of supports that form downward facing open channels that are either already attached to the overhang of the roof or are easily attachable to the overhang. The system also includes a plurality of protective walls that surround the building structure. The protective walls can be lifted from a resting position to a position where at least a portion of the walls fit into the downward facing open channels of the overhang. These walls are lifted by a hydraulic lifting system. The invention also provides a complete building structure already fitted with the supports, hydraulic lifting system and protective walls.

23 Claims, 5 Drawing Sheets

PROTECTIVE BUILDING STRUCTURE SYSTEM

FIELD OF THE INVENTION

This invention relates to sheltering structures particularly for protection against hurricanes, tornadoes, squalls and the like.

BACKGROUND OF THE INVENTION

Storms, hurricanes, typhoons, tornadoes and the like are devastating to building structures. In the United States, wind damage to building structures result in numerous injuries and deaths each year. Moreover, these storms also cause millions of dollars in property losses each year. Hurricane Andrew, which struck Florida in 1992, caused numerous injuries and deaths as well as an estimated $100 million in damages to residential homes alone. Even in the heaviest hit areas in Florida, however, where wind speeds exceeded 150 Knots, reinforced structures withstood the wind far better than non-reinforced structures.

Much of the wind damage to the structures occurred at "weak links" of the building structure, namely the junction between the roof and vertical support structures, i.e., walls. Another "weak link" of the building structures most affected by the storm, was the nailedsecured joints, i.e., where the aluminum siding attached to the outside of the structure or a joint securing one piece of material to another. When wind is able to get under these "weak links," as one is weakened, additional pieces that are attached are also weakened, causing the integrity of the structure to be compromised and sometimes totally destroyed.

In addition to winds causing damage to the outside of a structure, high velocity winds can also destroy a structure from the inside out. For example, if any of the openings in a structure are breached, the high velocity force of the winds entering the structure create positive pressure against the roof weakening the structure. At the same time the high velocity of the winds streaming over the roof on the outside creates a suction. This combination of internal positive pressure and external suction will inevitably tare the roof off of the house.

In an effort to prevent the breach of openings in the structure as well as, to protect windows and doors against shattering from debris colliding at high velocity, homeowners and businesses usually board-up openings with various types of panels when there is a threat that the weather pattern will bring high velocity winds. In the case of certain types of wind driven storms, i.e. squalls and tornadoes, however, the landowner may not have sufficient time to secure windows and doors from eminent destruction. Thus, in this situation the structure is left unprotected and is vulnerable to the force of the high velocity winds generated by the fast approaching weather pattern.

In cases where landowners have enough warning and are able to protect the openings in the structure, in many instances, corrugated metal panels are fastened over the openings by top and bottom rails which remain in place at all times even in non-hurricane seasons. Of course, the rails are very unsightly and distract from the clean lines of a structure. Other panels are fastened to the openings by screws screwed into permanent anchors which are placed into the flush walls surrounding the openings. These again are permanent installations that are very unsightly, are subject to corrosion, and potentially represent another "weak link" that may be affected by high velocity winds.

In addition, hurricane force winds of one hundred miles/hr and higher are known to set up harmonic vibrations that will result in rattling loose the above described installation because of the metal to metal contact between the fasteners and the corrugated metal panels. Further, anchors of various types are also prone to failure because of progressive corrosion in coastal areas. In addition, anchors driven into blocks which are hollow and only ½ inch thick are inadequate to hold a large force form shaking loose during a major storm.

In a residential setting where the resident decides to nail protective covers, i.e., plywood sheets, to the side of the house, most homeowner have no experience in nailing into concrete and any nailing close to the edge of an opening will simply break the block away behind the panel and any anticipated holding power is greatly diminished from this common mistake. Even assuming that the homeowner is able to nail the protective covers to the side of the house, there will always be at least one opening unprotected so as to provide for egress. This one opening when breached is enough to cause the internal positive pressure discussed above. Moreover, the nailed protective covers add additional "weak links" to the structure which are vulnerable to high velocity winds. In addition, although the techniques discussed above may provide some protection to a structure against high wind velocity, these techniques do not protect the walls and roofs of the structure. These sections of the structure remain vulnerable to the high velocity winds.

In view of the problems associated with the foregoing, there is a need for a protection system for building structures that is easy to implement, can withstand high winds, reduce the number of "weak links" in a structure, and protect a structure against destruction during high wind situations.

SUMMARY OF THE INVENTION

The present invention provides an interlocking roof and wall system for protecting a building structure. The interlocking roof and protective wall system comprises a plurality of supports that form downward facing open channels which are either already attached o an overhang or for existing roofs are attachable to the overhang. For the purpose of this application the term "interlocking" means any system where one piece fits into another. The plurality of protective walls that interlock into the overhang surround the building structure, a portion of the walls fit into the channel formed by the supports. The interlocking roof and protective walls can be secured in place by additional mechanisms or can simply lie within one another.

Surrounding at least a portion of the plurality of protective walls is a plurality of retainer walls. The retainer walls form a cavity which is at least partially below grade wherein the protective walls are positioned within. At the base of the protective walls is a hydraulic lifting system that is in contact with a portion of the protective walls. The hydraulic lifting system is actuable to extend a member which pushes against the protective walls, thereby lifting the protective walls out of the cavity formed by the retainer walls. The protective walls are lifted to a height whereby at least a portion of the protective walls interlock in the downward facing open channel attached to the overhang of the roof.

After the storm is over, the protective walls can be lowered back into the cavity formed by the retainer walls by releasing the hydraulic fluid from the pressurized cylinders, causing the protective walls to slowly disengage from the interlocking supports and rest in the cavity.

This system can be installed at the time of construction or can be retrofitted to most existing building structures. It is

DETAILED DESCRIPTION OF THE INVENTION

Figure 1:
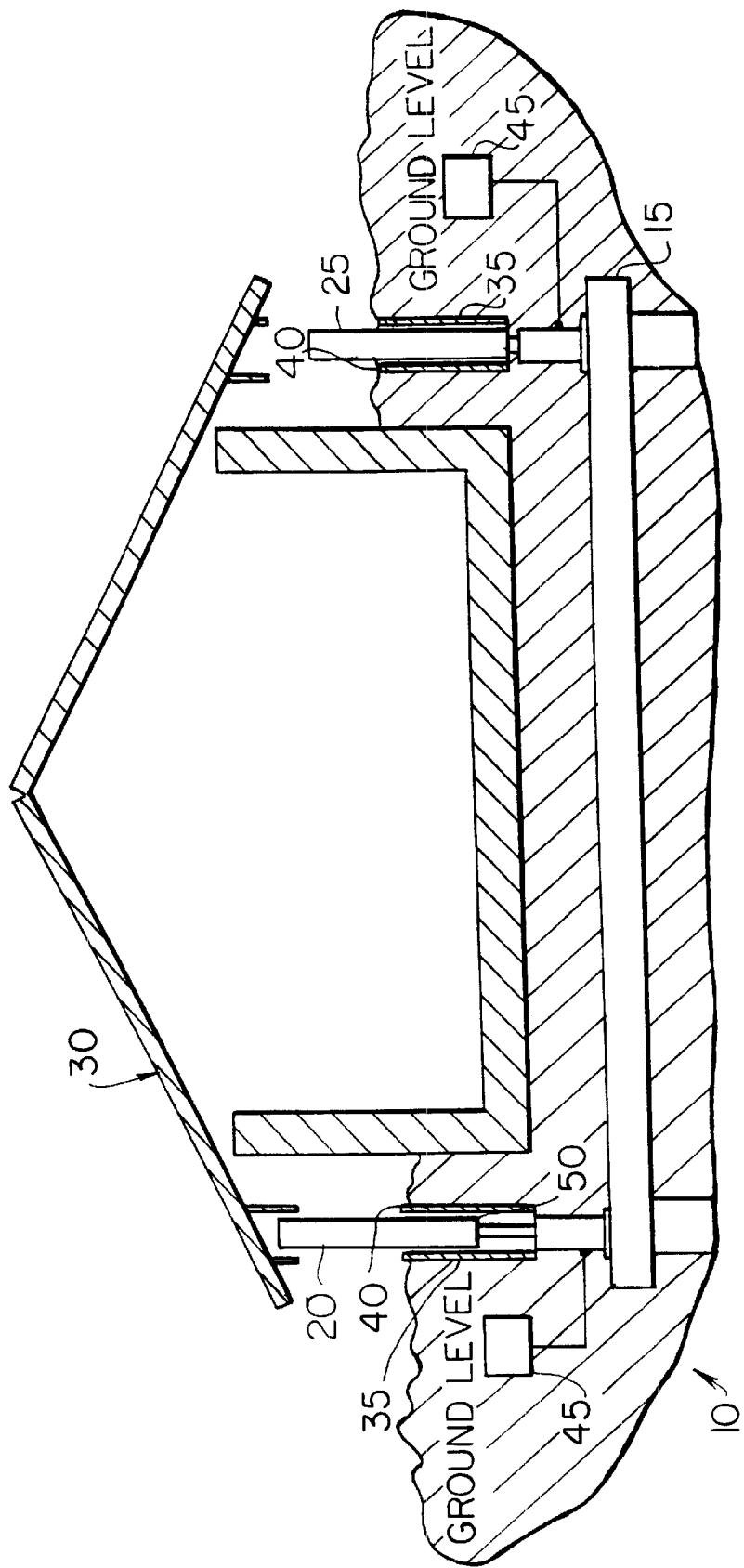
FIG. 1 illustrates a cross-section of a structure incorporating the protectable building system of one embodiment of the invention.

According to one embodiment of the present invention, a protectable building system 10 that has the appearance of a conventional house is depicted in FIG. 1. The protectable building system 10 may have a slab 15 foundation which is not required for the operation of the protectable building system, but is an easy construction method for building the structure. In addition to making construction easier, the slab 15 provides additional support for the protectable building 30 as well as protective walls 20 and 25 (described below).

The protectable building system 10 may be constructed on site, or may be a prefabricated modular design which is assembled on site. The protectable building system 10 is used as an illustrative example of the present invention which includes protectable building structures other than residential houses, such as commercial buildings.

Surrounding the protectable building structure 30 are protective walls 20 and 25. Protective walls 20 and 25 are spaced far enough away from the protectable building 30 so that when the protective walls 20 and 25 are extended (described below) there is ample clearance of any projections extending from the protectable house i.e. window frames, extended bay windows, or air conditioners. The preferable space between the protectable building 30 and protective walls 20 and 25 is between about 1 to about 4 feet, most preferably between about 1 to about 2 feet.

The protective walls 20 and 25 are constructed from material that is strong enough to withstand forces placed on the walls by high velocity winds. The width of the protective walls 20 and 25 vary according to the material used for its construction. In other words, the stronger the material, the thinner the wall; the weaker the material, the thicker the wall. The combination of material and thickness used, however, must be able to withstand forces associated with a wind velocity up to about 85 mph, preferably up to about 100 mph, more preferably up to about 150 mph.

The height of the protective walls 20 and 25 vary with the height of the structure being protected. Preferably the protective walls are at least about 1 to about 3 feet higher than the height of the structure being protected. The portion of the wall in excess of the height of the structure remains below grade even when the protective walls 20 and 25 are fully extended (described below). The portion of the protective wall that remains below grade provides additional support to the protective walls. In other words, if the protectable building structure 30 is about 15 feet above grade, the protective walls 20 and 25 are about 16 to 18 feet height. When these walls are extended to reach the roof (as described below) at least about 1 to about 3 feet remains below grade as support.

In one embodiment, surrounding the protective walls 20 and 25 are first and second retainer walls 35 and 40, respectively. The first retainer wall 35 is located closest to the protectable building structure 30 and second retainer wall 40 is furthest from the building structure 30. The width of the cavity formed by the space between the first and second retainer walls is greater than the width of protective walls 20 and 25 so that the protective walls fit within the first and second retainer walls 35 and 40. The first and second retainer walls 35 and 40 can be constructed from treated plywood, PVC, plastics, corrugated steel or the like. The number of retainer walls needed is directly proportional to the nuinber of protective walls needed to protect the building structure. In other words, if the size or shape of the structure requires additional protective walls, the number of retainer walls is also increased.

Figure 2:
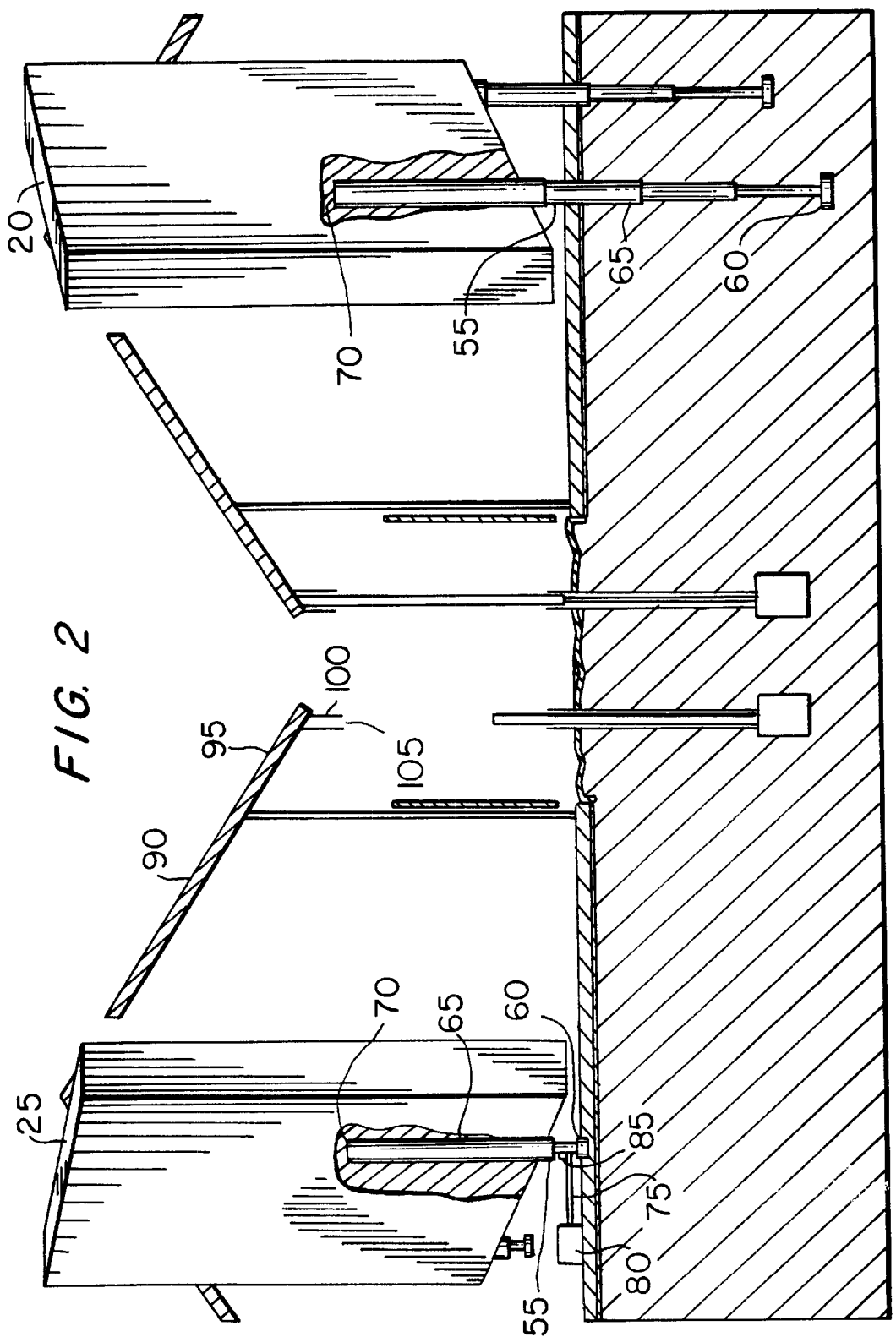
FIG. 2 illustrates a cross-section of a structure incorporating the protectable building system showing the hydraulic system of one embodiment of the invention.

The protective walls 20 and 25 are in contact with a hydraulic system 45 which is used to raise the protective walls 20 and 25 towards the roof. The hydraulic system 45 exerts an upward force against a lifting plate 50 which is embedded at the base of protective walls 20 and 25. The lifting plates 50 can be made of steel or any other material capable of enduring an upward force equal to or greater than the force exerted back on the plate by the weight of the wall. The hydraulic system 45 also includes at least two pressurizes cylinders shown in FIG. 2. The pressurized cylinders may be located inside the protective walls or outside the protective walls. FIG. 2 illustrates hydraulic cylinders that are located inside the protective walls.

In FIG. 2 a pressurized cylinder 55 is shown in the unextended and extended view. The pressurized cylinder 55 shows the base 60, a boom 65, and a top 70. The pressurized cylinders located within protective walls 20 and 25 do not require a lifting plate. The pressurized cylinder 55, can be activated by either air or fluid. The boom 65, whether located inside the protective walls or outside the protective walls, desirably has three stages and is capable of extending a height at least equal to the height of the protectable building structure 30.

In one embodiment illustrated in FIG. 2, the pressurized cylinders are located outside the protective walls and the top 70 of boom 65 is anchored to the lifting plate 50 located at the bottom of the protective walls. The lifting plate located on the top portion of the pressurized cylinder is attached flush against the underside portion of the lifting plate 50. Desirably, lifting plate 50 includes a depression into which the top portion of the pressurized cylinder 55 is attached. The depressed portion of the lifting plate 50 provides additional lateral strength to the connection between the pressurized cylinder 55 and lifting plate 50. This connection prevents slippage of the pressurized cylinder 55 when the hydraulic system 45 is applying lifting forces to the lifting plate.

The hydraulic system also includes a pressurized hydraulic line 75 which extends from a pump 80 to an inlet valve 85 (FIG. 3) located at the base 60 of the pressurized cylinder 55. At least four pressurized cylinders positioned beneath the protective walls 20 and 25 are required to lift the protective walls from the cavity to protect a four sided building structure. Additional protective walls and pressurized cylinders may be required to accommodate uniquely shaped structures, i.e., structures having a shape different than a square or a rectangle.

When the pump 80 is activated, fluid or air is pumped into the inlet valve 85 in the base 60 of the pressurized cylinder 55 and the boom 65 begins to rise. The boom 65 provides an upward vertical force on the lifting plate 50, thereby lifting the protective wall above grade. In one embodiment, the hydraulic cylinders are equipped with the control valves that maintain the hydraulic cylinders at a predetermined height until the locking control valves are deactivated and the hydraulic cylinders lowered to a resting position. The pump 80 can be powered by electric and can be connected to a back-up 12-volt battery in case of power failure. In the alternative the pump can be powered by a gas generator.

Figure 3:
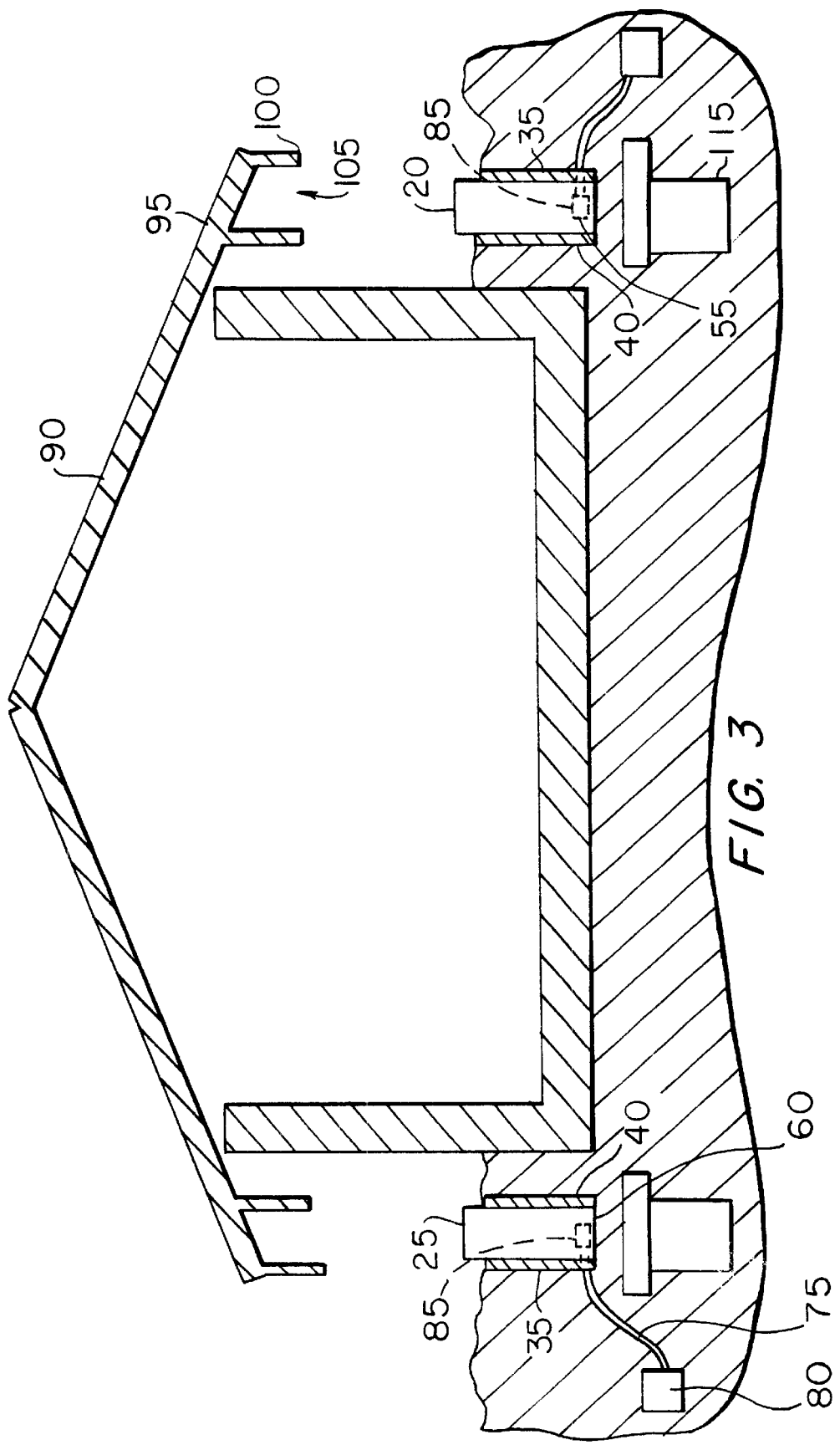
FIG. 3 illustrates a cross-section of a structure incorporating the protectable building system showing the roof overhang support of one embodiment of the invention.

FIG. 3 illustrates one embodiment where the roof 90 of the protectable building structure 30 has a overhang 95. Attached to the underside of the overhang 95 is a support 100 forming a downward facing channel 105. The downward facing channel 105 has a width that is greater than the width of the protective walls 20 and 25 so that the top portion of the protective walls fit within the channel 105 of the support 100. In one embodiment, the top portion of the protective wall has a cut-away portion (not shown) that interlocks into the channel 105 of the support 100 whereby the outside portion of the support is flush with the outside portion of the protective walls 20 and 25. This arrangement reduces the production of "weak links" discussed above, which in turn reduces the chance of high velocity winds can weakening the building structure. The supports 100 can be made of a reinforced material such as corrugated galvanized metals, reinforced wood, or the like. In any case, the supports 100 must be strong enough to both support the protective walls 20 and 25 and to prevent the roof from disconnecting from the building structure, when subjected to high velocity winds.

In one embodiment of the present invention, the supports 100 are located at the outermost portion of the overhang 95. Positioning the supports 100 at the outermost portion of the overhang 95 reduces the amount of the overhang that is exposed to the high velocity winds once the protective walls 20 and 25 are in place. In other words, the outside surface of the protective walls 20 and 25, once positioned into the supports 100, sit flush against the rim of the overhang 90 thereby exposing little if any of the overhang 95 to the high velocity winds. Since winds can easily get under the rim of the overhang 95 and pry the roof from the building structure, reducing the exposure of the overhang 95 to the winds reduces yet another "weak link" in the building structure.

The supports may be equipped with a locking mechanism that interlocks the top portion of the protective walls into the supports. The locking mechanism (not shown) can be manually or automatically engaged once the top portion of the protective walls comes in contacts with the support. When fluid is drained from the hydraulic cylinders the locking mechanism can be manually or automatically disengaged so as to permit the protective walls to be lowered back into the cavity formed by the reinforced walls.

Figure 4:
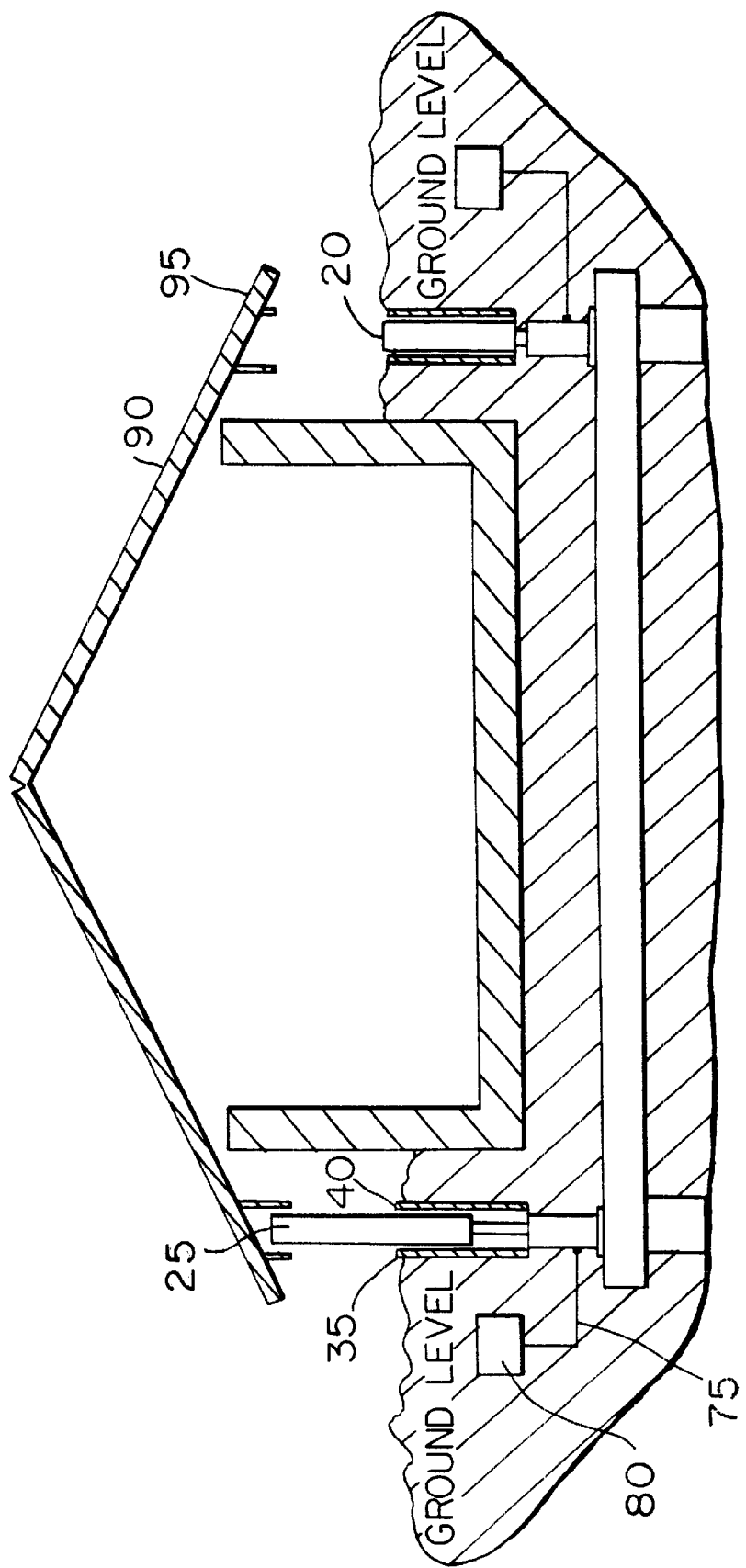
FIG. 4 illustrates cross-section of a structure incorporating the protectable building system of an alternative embodiment of the invention.

Since the protective walls 20 and 25 are usually heavy, one embodiment is equipped with one or more guide posts that are position in close proximately to the protective walls. These guide posts 110 shown in FIG. 4 provide strength and rigidity to the protective walls and are used to maintain the path of the walls as they are lifted and lowered. The guide posts 110 as well as the protective walls 20 and 25 are anchored in caissons 115. Illustratively, the caissons 115 are concrete caissons made by pouring cement into cylindrical sona tubes made of waterproof cardboard which act as a mold and disintegrate over time.

The caissons 115 begin at the existing grade level and extend below ground a distance dictated by the soil density and size/height of the protective walls 20 and 25. Preferably, the distance is at least about 2 to about 5 feet below the existing grade level. The soil and protective wall size also dictate the size of the caissons 105 as well as the guide posts 110. Preferably, the diameter of the caissons 115 is about twice the diameter of the guide posts 110. Illustratively the guide posts 110 are 4"×8" steel H-beams which may be galvanized to prevent corrosion, and the diameter of the caissons 115 is about 16", being twice the 8" dimension of the guideposts 110.

Figure 5A:
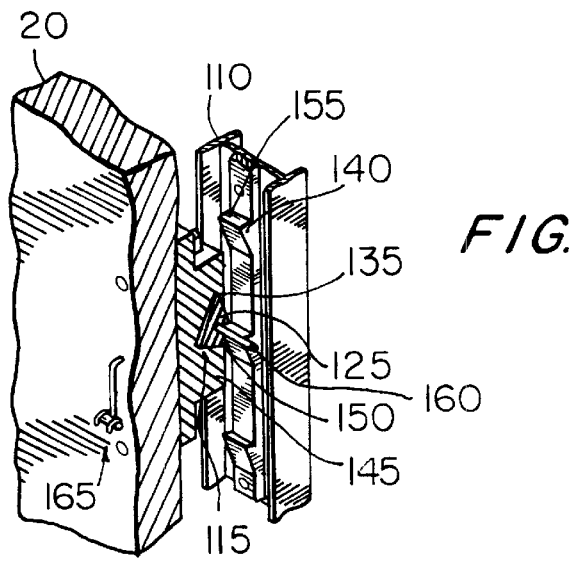
FIG. 5A is a cutaway view of a roller and ratchet mechanism of one embodiment of the invention.
Figure 5B:
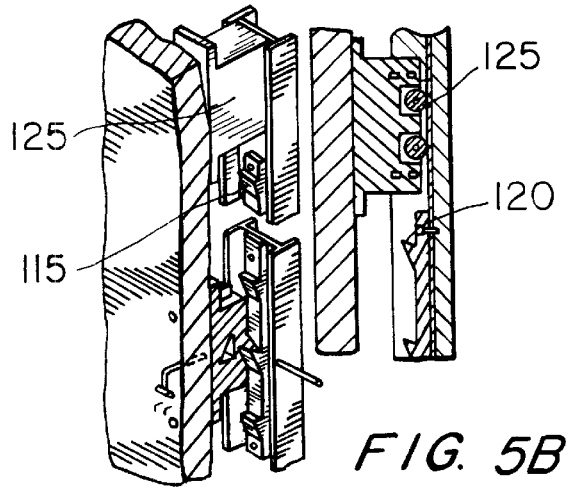
FIG. 5B is a cutaway view of a roller and ratchet mechanism of an alternative embodiment of the invention incorporating a cross-sectional view of the roller and ratchet mechanism.

FIG. 5A illustrates one embodiment wherein the guide posts 110 work in conjunction with roller guides 120 and a ratchet mechanism 115. The protective walls 20 and 25 have rollers 125 which roll along the guide posts 110 during vertical movement of the protective walls, i.e., when the hydraulic cylinders are activated. Below the rollers 125, the ratchet mechanism 115 is located between the protective walls 20 and 25 and the guide post 110. The ratchet mechanism 115 permits the protective walls 20 and 25 to rise along the guide posts 110 as the boom of the hydraulic cylinder is extended and prevents a accidental lowering of the protective walls. The roller 125 is attached to the outer surface of the protective walls 20 and 25. The ratchet mechanism 115 has two parts. The first part is attached to the guide posts 110 and the outer surface of the protective walls and the second part is attached to the outer portion of the protective walls. Each guide post 110 has its own ratchet 115 and roller 125 mechanism. The rollers 125 roll along the larger section of the guide post 110. The rollers 125 may be bolted or anchored into the protective walls 20 and 25 using bolts, two J-hooks or a single U-shaped J-hook (not shown). The rollers 125 maybe rubber, Teflon™, hard plastic or rubberized metal. Illustratively in FIG. 5B, the rollers 125 are located above the ratchet mechanism 115. Alternatively, the rollers 125 may be located adjacent to the ratchet mechanism 115. This allows the first part of the ratchet mechanism 115 to extend further up the guide post 110, thus permitting the protective walls 20 and 25 to remain locked in place at a higher height. The ratchet mechanism 115 keeps the protective walls 20 and 25 in an elevated position after the protective walls have been raised by pressurized cylinders.

The first part of the ratchet mechanism 115 is attached to the guide post 110 via bolts, welding or the like. The first part of the ratchet mechanism 115 has fixed teeth 140 separated by segments. The second part of the ratchet mechanism 115 has a body which is attached, e.g., bolted, to the outer surface of the protective walls 20 and 25 with bolts. In addition, the second part of the ratchet mechanism 115 has a locking lever 130 which is attached to the body via a hinge 135 located at the top of the movable tooth 145. The fixed teeth 140 of the first part mate with the movable teeth 145 of the second part to prevent a premature lowering of the protective walls 20 and 25. In other words, the surfaces 155 of the movable teeth and the surfaces 145 of the fixed teeth 150 complement each other so as to temporarily lock together. This ratchet system allows the protective walls 20 and 25 to rise but prevent them from descending. Preferably, the surface 155 of the movable teeth 145 has a downward slant and the surface 150 of the fixed teeth 140 have an upward slant. This provides a better locking of the first and second parts of the ratchet when the surfaces 155 of the movable teeth 145 mate with the surfaces 150 of a fixed teeth 140. In one embodiment, the movable teeth 145 of the second part are pushed forward by a spring loaded rod (not shown) which is attached to the back of the movable teeth 145.

The ratchet mechanism 115 can also be equipped with a locking lever 130 that locks the ratchet mechanism 115 in place when the walls are stationary in the raised position. The locking lever 130 can be attached to an emergency locking lever release cord that releases the ratchet mechanism 115 when it is pulled away from the protective walls. In other words, the locking lever 130 disengages from the fixed teeth 140 and the protective walls 20 and 25 are free to move in the vertical position. Upon releasing the locking lever, fluid, i.e., gas or oil, can be released from the pressurized fluid resulting lowering of the protective walls into the cavity formed by the first and second retainer walls 35 and 40.

The operation of the protective wall system is as follows. In the event of an approaching weather front with sustained winds greater than 50 mph, the hydraulic lifting system 45 can be activated to lift the protective walls 20 and 25 into position. When the hydraulic system is activated a pump, which is attached to the pressurized cylinders 55 via a pressurized hydraulic line 75, begins to pump fluid into the pressurized cylinders 55. The pump 80 is attached to a flow divider (not shown) by connecting lines. The flow divider evenly distributes the fluid pumped by the pump to the pressurized cylinders 55. As the pressured cylinders begin to fill with fluid, the booms begin to extend out of the pressurized cylinders and exert an upward force on the protective walls. As shown in the figures, the boom 65 may be located within the protective walls 20 and 25 or positioned so that a portion of the boom 65 is in contact with a portion of the protective walls 20 and 25. When the boom is outside the protective walls, the portion of the protective walls that experience the bulk of the stress due to the upward force is further supported by a lifting plate 50. If the boom 65 is inside the protective wall, no lifting plate is necessary. As a result of this upward force, the protective walls 20 and 25 rise out of the cavity formed by the first and second retainer walls 30 and 40. In one embodiment, the walls are guided by several guide posts 110 that provide support as well as guidance for the vertical movement of the rising walls. In another embodiment no guide posts are utilized.

When the protective walls 20 and 25 rise, the movable teeth 145 of the ratchet system attached to the guide posts 110 are pushed back toward the walls as it slides up the fixed teeth 140. When the movable teeth 145 reaches over one of the fixed teeth 140, the spring loaded rod pushes the movable teeth 145 forward toward the guide post 110. This extends the movable teeth 145 over the fixed teeth 140 and prevents the protective walls 20 and 25 from accidentally lowering. The protective walls 20 and 25 are lifted until the upper portion of the protective walls fit into a downward facing channel formed by the supports 100 attached to the overhang 95 of the roof. Once at least a portion of the protective walls fit into the downward channel 105 of the supports 100, the protective walls 20 and 25 enclose the building structure 30 and protect it from high velocity winds. Once the walls are in this position, the pressurized cylinders 55 are locked in place by the ratchet mechanism 15.

After the winds diminish, in order to allow a lowering of the protective walls 20 and 25 of the embodiment containing guide posts 100, the movable tooth 145 that is in the locked position is manually pulled back and locked in a recessed position. Illustratively, a release cord 165 (FIG. 5A), which may be constructed of braided rope or metal mesh, has one end attached to the spring loaded rod and the other to a handle. Alternatively, the spring loaded rod can be dispensed and the release cord 165 directly attached to the movable teeth 145. In this embodiment, instead of the spring being coiled around the rod, it is coiled around a portion of the release cord 165 which is between the outer surface of the protective wall 20 and 25 and the movable teeth 145. The spring, whether it is coiled around the braided rope or the rod has a diameter larger than the diameter of the hole that the braided rope and the rod pass through. This keeps the spring between the outer surface of the wall 20 and 25 and the movable teeth 145. Alternatively, or in addition to the spring, the hinge 135 of the movable teeth 145 may be spring loaded to bias the movable teeth 145 in the forward direction toward the guide post 110. The movable teeth 145 is recessed back by pulling on the handle. To lock the movable teeth 145 in a recessed position, the handle is hooked on the protrusions attached to the inner surface of the protective walls 20 and 25.

In an alternative, a safety pin 160 (FIG. 5A) may be inserted in a hole of a fixed plate positioned on the side of the movable teeth 145. The fixed plate (not shown) is located at the other side of the movable teeth 145. When the safety pin 160 enters the hole in the fixed plate, the movable teeth 145 is locked in a recessed position. When the movable teeth 145 are locked in this position, the protective walls 20 and 25 can freely slide down the guide posts 110.

The movable teeth 145 may be pulled back easily when it is located along the segments between two of the fixed teeth 140. However, pulling back the movable teeth 145 is nearly impossible when it is resting on the fixed teeth 140, supporting the weight of the protective walls 20 and 25 and preventing it from lowering. Therefore, to be able to pull back the movable teeth 145 while it is supporting the weight of the protective walls 20 and 25, it is necessary to lift the protective walls 20 and 25. This removes the weight of the protective walls from the movable teeth 145 so that it may be pulled back to the recessed position. The protective walls may be lifted using the pressurized cylinders 55. The protective walls 20 and 25 need only be lifted approximately ¼ inch in order to release the engagement of the movable teeth 145 into the fixed teeth 140 and allow the protective walls to lower back into the cavity formed by the reinforced walls.

In the embodiments that are not equipped with guide posts, the protective walls are lowered by simply releasing the fluid from the hydraulic cylinders so that the boom begins to lower. When substantially all the fluid is released from the hydraulic cylinders, the boom is in the resting position. To lift the boom, fluid is again pumped into the hydraulic cylinders.

While the invention has been described by the references to specific embodiments, this was for the purposes of illustration only and should not be construed to limit the spirit or the scope of the invention. Numerous alternative embodiments may be devised by those skilled in the art without departing from the spirit and scope of the following claims.

What is claimed is:

1. An interlocking roof and wall system for protecting a structure comprising:

a plurality of supports that are attachable to an overhang of a roof which collectively form a plurality of downward opening channels;

a plurality of walls adapted to surround a structure to be protected, wherein at least a portion of the each wall fits into the supports;

a plurality of first and second retainer walls spaced oppositely apart from one another forming a cavity having a width which exceeds the width of the walls adapted to surround the structure such that the walls fit within the cavity; and a hydraulic lifting system which is in contact with the plurality of walls, the hydraulic lifting system being actuatable to extend a member which pushes against the walls, thereby lifting the walls out of the cavity formed by the retainer walls so that at least a portion of the walls contact the supports.

2. An interlocking roof and wall system according to claim 1 further comprising a plurality of pilasters positioned beneath the hydraulic lifting system adapted to extend into ground, the pilaster providing support for the hydraulic lifting system.

3. An interlocking roof and wall system according to claim 1 wherein the hydraulic lifting system comprises a plurality of pressurized cylinders, each of which includes a boom to act as the extendible member.

4. An interlocking roof and wall system according to claim 3 wherein the boom is a multi-stage boom which is capable of extending at least about 20 feet.

5. An interlocking roof and wall system according to claim 3 further comprising a plurality of reinforced plates having two sides, the reinforced plates being attached to the wall via a plurality of lag bolts on one side and in contact with the pressurized cylinders on the other side.

6. An interlocking roof and wall system according to claim 3 further comprising a pump connected to the pressurized cylinders via pressurized lines for actuating the pressurized cylinders to lift the walls out of the cavity formed by the reinforced walls so that at least a portion of the reinforced wall comes in contact with the supports.

7. An interlocking roof and wall system according to claim 6 further comprising a generator connected to the pump for supplying power to the pump.

8. An interlocking roof and wall system according to claim 1 wherein the plurality of retainer walls are constructed of material selected from the group consisting of treated plywood, polyvinyl chloride, plastics, concrete panels and galvanized steel.

9. An interlocking roof and wall system according to claim 1 wherein the hydraulic lifting system is positioned within the walls.

10. An interlocking roof and wall system according to claim 3 wherein the plurality of pressurized cylinders are self lubricating.

11. An interlocking roof and wall system according to claim 3 further comprising locking control valves in communication with the plurality of hydraulic cylinders which maintain the hydraulic cylinders at a predetermined height until the locking control valves are deactivated and the hydraulic cylinders lowered to a resting position.

12. An interlocking roof and wall system according to claim 1 further comprising a ratchet and roller backup system which maintains the exact height of the walls even when the hydraulic cylinders are unpressurized.

13. An interlocking roof and wall system according to claim 1 further comprising guide posts which are in contact with the walls wherein the guide posts provide support for the walls and guidance for the vertical movement of the walls as the walls are lifted from the cavity formed by the retainer walls.

14. A protective structure comprising:

a roof, a floor and a plurality of walls connected to form a building structure wherein the roof has an overhang;

a plurality of supports attached to the overhang which collectively forms a plurality of downwardly facing channels;

a plurality of protected walls which surround the walls of the structure;

a plurality of retainer walls positioned below grade forming a cavity having a width which exceeds the width of the protective walls such that the walls are positioned within the cavity; and a hydraulic lifting system having a plurality of pressurized cylinders which are actuatable to extend a member which pushes against the walls, thereby lifting the walls out of the cavity formed by the retainer walls such that at least a portion of the walls come in contact with the supports.

15. A protective structure according to claim 14 further comprising a plurality of pilasters positioned beneath the hydraulic lifting system adapted to extend into ground, the pilasters providing support for the hydraulic lifting system.

16. A protective structure according to claim 14 wherein the reinforced walls are constructed of material selected from the group consisting of treated plywood, polyvinyl chloride, plastics, concrete panels and galvanized steel.

17. A protective structure according to claim 14 wherein the boom is a multi-stage boom capable of extending at least about 20 feet.

18. A protective structure according to claim 14 further comprising a plurality of reinforced plates attached to the wall via a plurality of lag bolts, the reinforced plates being in contact with the pressurized cylinders.

19. A protective structure according to claim 14 further comprising a pump connected to the pressurized cylinders via pressurized lines for actuating the pressurized cylinders to lift the walls out of the cavity formed by the reinforced walls such that at least a portion of the reinforced wall comes in contact with the supports attached to the roof.

20. A protective structure according to claim 14 further comprising a generator connected to the pump for supplying power to the pump.

21. A protective structure according to claim 14 wherein the hydraulic lifting system is positioned within the wall.

22. A protective structure according to claim 14 further comprising locking control valves in communication with the plurality of hydraulic cylinders which maintain the hydraulic cylinders at a predetermined height until the locking control valves are deactivated and the hydraulic cylinders lowered to a resting position.

23. A protective structure according to claim 14 further comprising a ratchet and roller backup system which maintains the exact height of the walls even when the hydraulic cylinders are unpressurized.

* * * * *